(12) United States Patent
Bennett

(10) Patent No.: US 9,058,562 B2
(45) Date of Patent: Jun. 16, 2015

(54) TRAFFIC PREDICTION FOR WEB SITES

(71) Applicant: Google Inc., Mountain View, CA (US)

(72) Inventor: Victor Bennett, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/168,424

(22) Filed: Jan. 30, 2014

(65) Prior Publication Data

US 2014/0149333 A1 May 29, 2014

Related U.S. Application Data

(63) Continuation of application No. 11/228,217, filed on Sep. 19, 2005, now Pat. No. 8,670,319.

(51) Int. Cl.
*H04L 12/26* (2006.01)
*G06N 5/02* (2006.01)
*G06F 17/30* (2006.01)
*G06Q 10/04* (2012.01)

(52) U.S. Cl.
CPC ............ *G06N 5/022* (2013.01); *G06F 17/3089* (2013.01); *G06Q 10/04* (2013.01); *H04L 43/0888* (2013.01)

(58) Field of Classification Search
USPC .................. 370/230–235, 252; 709/217–226
See application file for complete search history.

(56) References Cited

U.S. PATENT DOCUMENTS

| | | | |
|---|---|---|---|
| 5,796,952 A | 8/1998 | Davis et al. | |
| 6,810,356 B1 * | 10/2004 | Garcia-Franco et al. | 702/179 |
| 2003/0018778 A1 * | 1/2003 | Martin et al. | 709/224 |
| 2003/0101024 A1 | 5/2003 | Adar et al. | |
| 2004/0111508 A1 | 6/2004 | Dias et al. | |

OTHER PUBLICATIONS

US Office Action on U.S. Appl. No. 11/228,217 Dtd Jun. 26, 2013, 11 pages.
US Notice of Allowance on U.S. Appl. No. 11/228,217 Dtd Oct. 24, 2013, 7 pages.
CA Office Action on CA 2,623,773, Dtd May 28, 2014, 4 pages.

* cited by examiner

*Primary Examiner* — Alvin Zhu
(74) *Attorney, Agent, or Firm* — Foley and Lardner LLP; John D. Lanza

(57) ABSTRACT

A traffic prediction component may automatically generate predicted traffic profiles for web sites based on tags that characterize the sites. An initial set of tags can be selected for a web site based on a set of predefined rules. An initial traffic profile may be selected based on the initial set of tags. The predicted profile of user traffic is then generated based on the initial set of tags and on the initial traffic profile.

22 Claims, 6 Drawing Sheets

TRAFFIC PREDICTION FOR WEB SITES

CROSS-REFERENCE TO RELATED PATENT APPLICATIONS

This application is a Continuation of U.S. application Ser. No. 11/228,217, filed Sep. 19, 2005, incorporated herein by reference in its entirety.

BACKGROUND OF THE INVENTION

Implementations described herein generally relate to the prediction of user traffic for online sites.

In an increasingly networked world, consumers frequently use online resources to access information. For example, search engines are a popular tool through which users enter a search query describing information of interest and receive back documents or links to documents that relate to the search query. Search engines may be tailored to a particular area of interest, such as a general web search engine, a news search engine, or a shopping search engine.

It may be desirable for an operator of an online resource, such as a search engine, to be able to intelligently predict information about the type of users that are likely to visit a particular web site. This type of "traffic prediction" can be used, for example, when the search engine displays advertisements that link to a particular web site. If the search engine provider knows a general profile that characterizes traffic that is likely to click on a particular advertisement or visit the web site referenced by the advertisement, the search engine provider may be able to spot invalid or non-genuine user activity that is not reflective of true user interest. Distinguishing invalid user activity (i.e., traffic) from genuine user activity can be particularly important when, for example, the search engine provider charges advertisers based on the traffic that is referred to the advertiser's web site. In this situation, the search engine provider may like to be able to distinguish invalid user activity from genuine user activity and only charge the advertiser for the genuine user activity.

Predicting user activity can be useful in a number of online contexts in addition to the display of advertisements and outside of the context oif a search engine. For example, a web site designer may wish to predict how a proposed change to a web site will affect user activity at or to the web site.

SUMMARY OF THE INVENTION

One aspect is directed to a computer-implemented method of predicting a profile of user traffic at a web site. The method may include characterizing the web site based on at least one feature of the web site; selecting an initial traffic profile based on the characterization of the web site; and generating the predicted profile of user traffic based on the characterization of the web site and the initial traffic profile.

Another aspect is directed to a computer-implemented method of modeling a web site. The method includes assigning an initial set of tags to the model based on features of the web site, each of the tags describing at least one feature of the web site. The method further includes determining an initial traffic profile for the web site based on the assigned initial set of tags and recursively updating the set of tags and the traffic profile to obtain a final predicted traffic profile for the web site.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

Implementations consistent with the principles of the invention predict traffic patterns at a web site based on features of the site.

Figure 1:
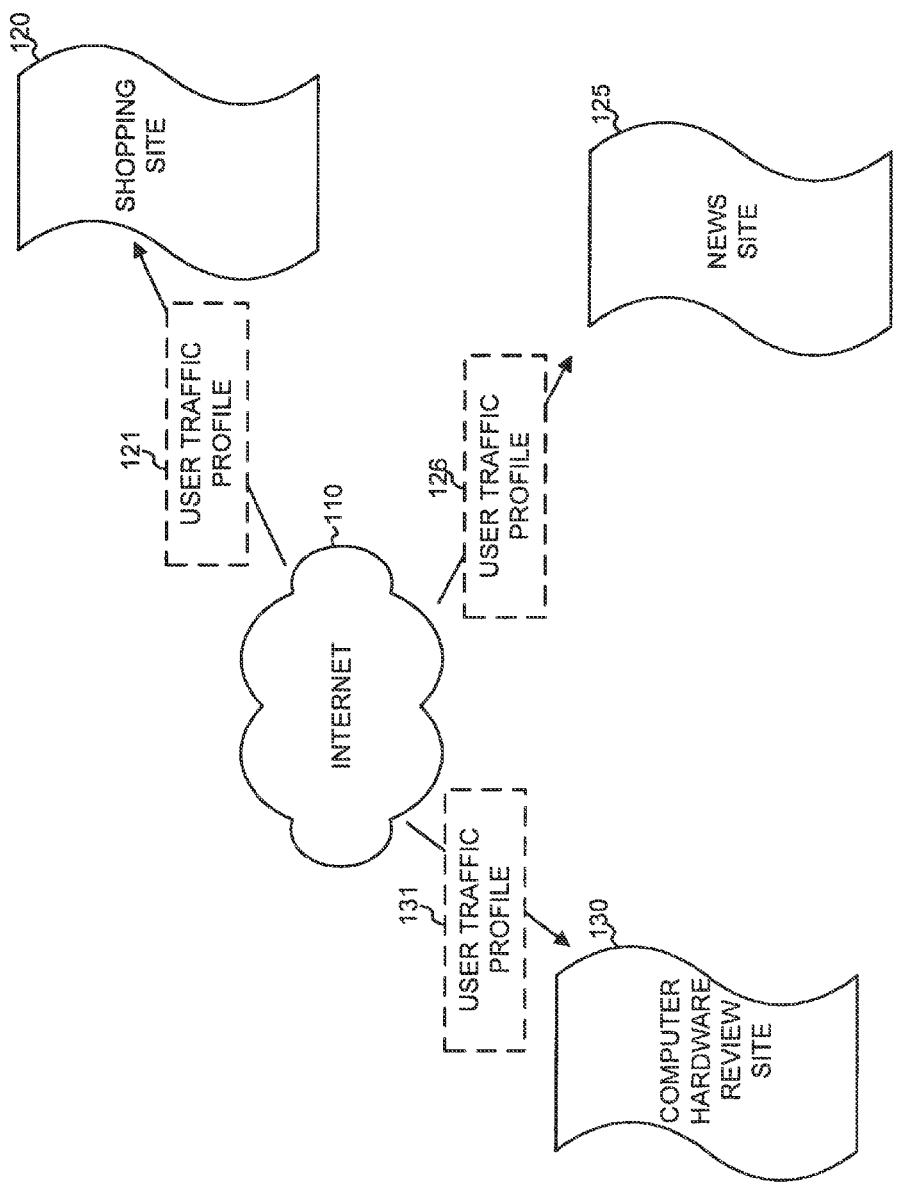
FIG. 1 is a diagram conceptually illustrating, at high level, an exemplary implementation consistent with aspects of the invention.

FIG. 1 is a diagram conceptually illustrating, at high level, an exemplary implementation consistent with aspects of the invention. Consider a network, such as Internet 110, that connects users to web sites. Three exemplary web sites are shown: an online shopping site 120, a general news site 125, and a site 130 that reviews new consumer computer hardware. Sites 120, 125, and 130 are different from one another in a number of aspects. For example, site 120 is a shopping site while sites 125 and 130 are informational sites. Site 125, as a news site, may draw a wider audience than site 130, which is targeted to computer enthusiasts. Sites 120, 125, and 130 are likely to be different from one another in a number of additional ways, such as in the layout of the sites, the color schemes used by the sites, and the types of words used by each of the sites.

Depending on the different features of different web sites (such as the different features of sites 120, 125, and 130), web surfers may exhibit fundamentally different behavior. That is, a person visiting shopping site 120 may behave differently than when visiting news site 125. For example, news site 130 is likely to contain longer articles that a user is likely to read for a longer period of time than the product descriptions on shopping site 120.

Consistent with an aspect of the invention, user traffic profiles 121, 126, and 131 may be predicted for sites 120, 125, and 130, respectively, based on features associated with sites 120, 125, and 130. Each of traffic profiles 121, 126, and 131 may describe how, in aggregate, an average visitor to the site is expected to behave.

System Description

Figure 2:
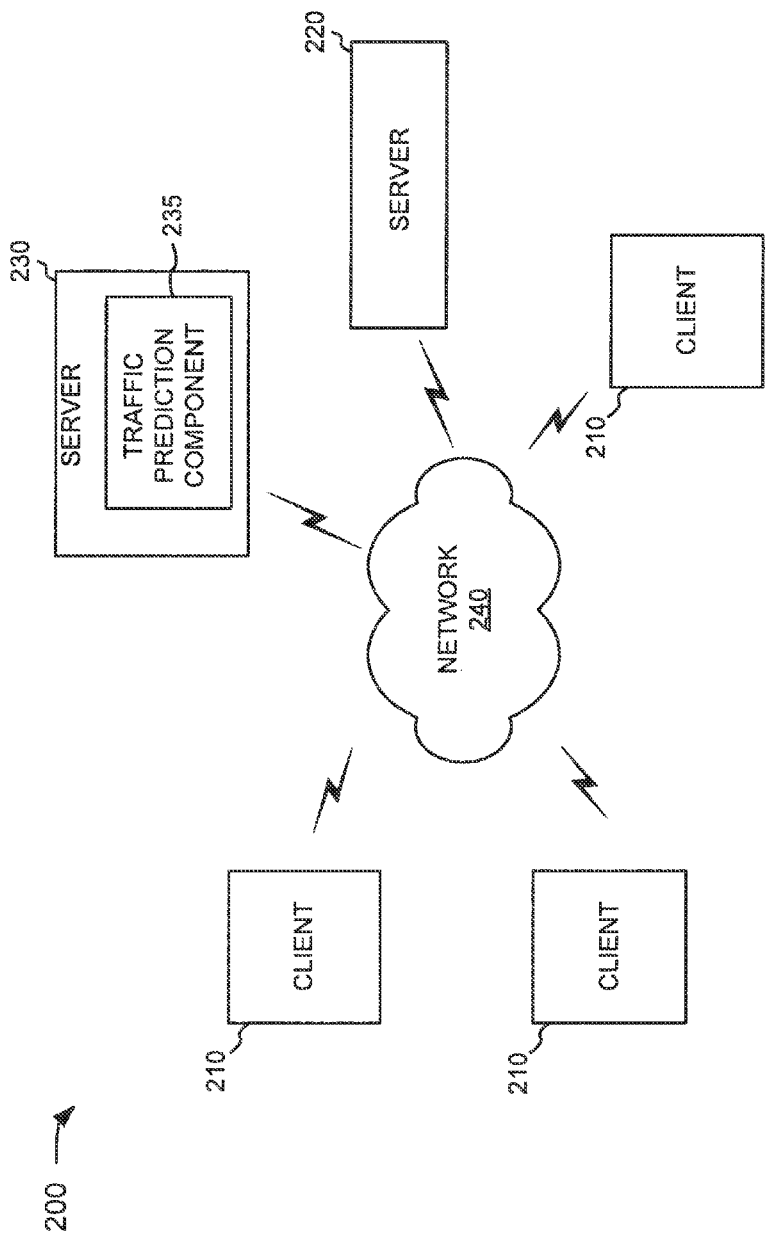
FIG. 2 is a diagram of an exemplary system in which concepts consistent with the principles of the invention may be implemented.

FIG. 2 is a diagram of an exemplary system 200 in which concepts consistent with the principles of the invention may be implemented. System 200 may include multiple clients 210 that can connect to servers 220 and 230, via a network 240. Servers 220 and 230 may include devices that provide services to clients 210, such as web servers, email servers, etc.

In one implementation, one or more of servers 220 and 230 include traffic prediction component 235. Traffic prediction component 235, as will be described in more detail below, generates user traffic profiles for web sites. Instead of being implemented on a server connected to network 240, traffic prediction component 225 may more generally be implemented on any computing device, whether or not connected to a network.

Network 240 may include a local area network (LAN), a wide area network (WAN), a telephone network, such as the Public Switched Telephone Network (PSTN), an intranet, the Internet, or a combination of networks. Three clients 210 and two servers 220 and 230 are illustrated as connected to network 240 for simplicity. In practice, there may be more clients and/or servers. Also, in some instances, a client may perform one or more functions of a server and a server may perform one or more functions of a client.

A client 210 may include a device, such as a personal computer, a wireless telephone, a personal digital assistant (PDA), a lap top, or another type of computation or communication device, a thread or process running on one of these devices, and/or an object executable by one of these devices. Users of clients 210 may access or receive information from servers 220 and 230.

Exemplary Computing Device Architecture

Figure 3:
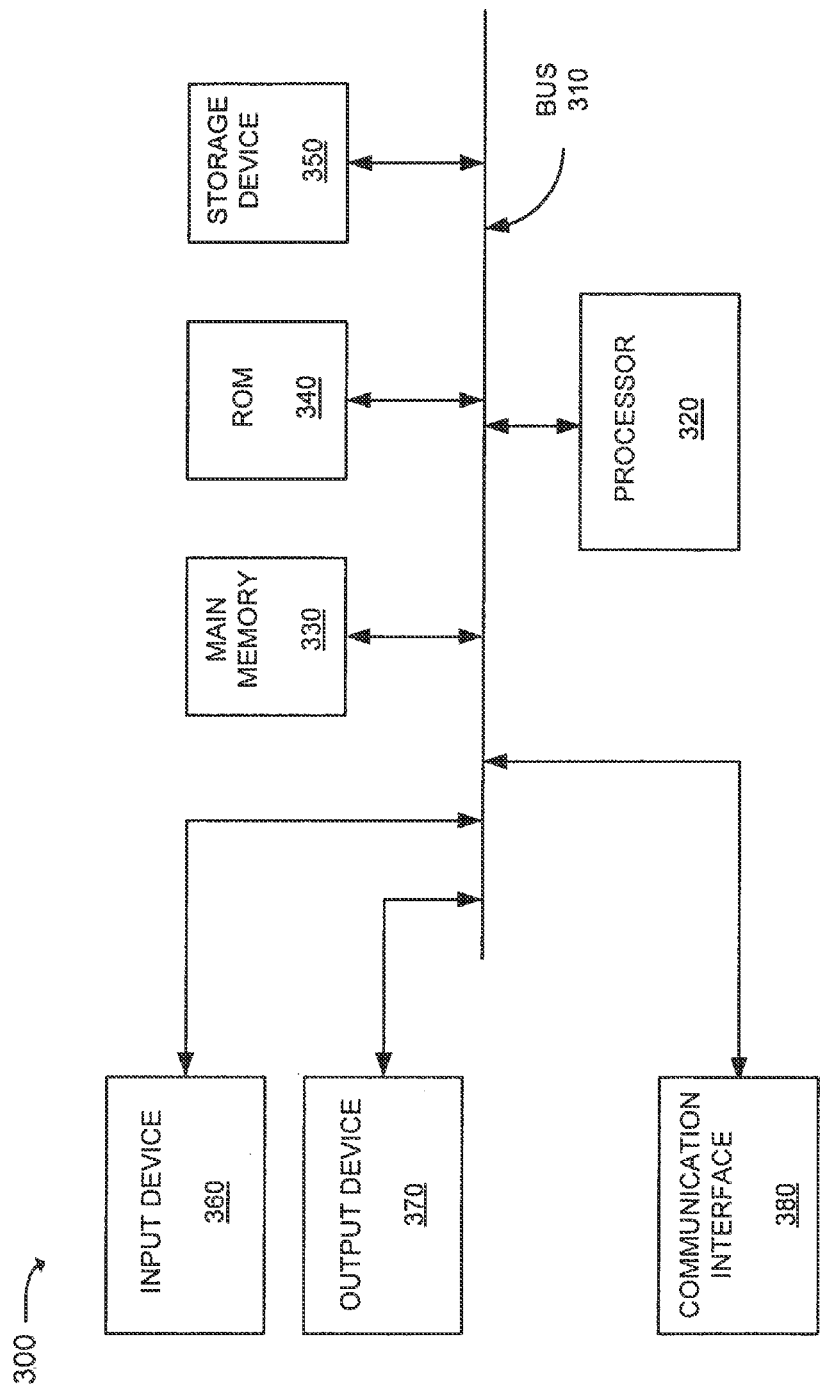
FIG. 3 is an exemplary diagram of one of the computing devices illustrated in FIG. 2.

FIG. 3 is an exemplary diagram of computing device 300, such as one of clients 210, server 220, or server 230. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits a user to input information to computing device 300, such as a keyboard, a mouse, a pen, voice recognition and/or biometric mechanisms, etc. Output device 370 may include a mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Traffic prediction component 235 may be implemented in software and stored in a computer-readable medium, such as memory 330. A computer-readable medium may be defined as one or more physical or logical memory devices and/or carrier waves.

The software instructions defining traffic prediction component 235 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Traffic Prediction Component 235

Traffic prediction component 235 may generally operate to categorize web sites in a way consistent with differences in the web sites that lead to or are correlated with different traffic profiles for the sites. A traffic profile for a site, as this phrase is used herein, refers to any set of data that tends to characterize users of the web site or how the users tend to behave at the site. Examples of factors that can be included in a traffic profile include: how long a typical user will spend at the site, how "deep" or how many links a typical user will click on within the site, the screen size of a typical user, the type of browser of a typical user, or user demographic information.

Figure 4:
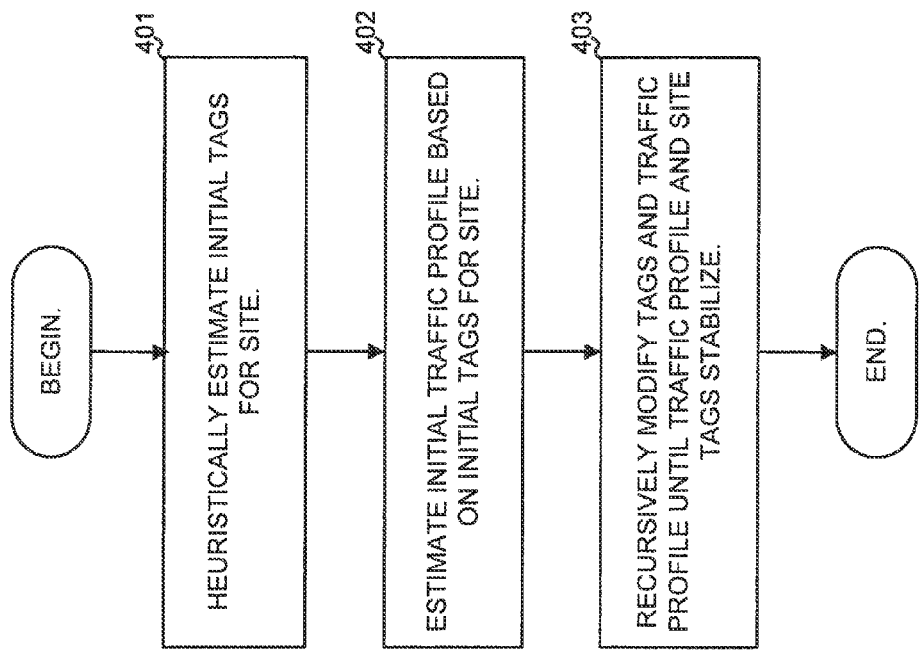
FIG. 4 is a flow chart illustrating exemplary operations of the traffic prediction component shown in FIG. 2 in generating a traffic prediction model for a web site.

FIG. 4 is a flow chart illustrating exemplary operations of traffic prediction component 235 in generating a traffic prediction model for a web site. A web site may be described (i.e., categorized) by a plurality of labels or tags that describe various aspects of the site. An initial set of tags that describes the site may be heuristically determined for the web site (act 401). For example, a predetermined set of rules may be used to generate the initial set of tags.

Based on the initial tags that describe the web site, an initial traffic profile for the site may be determined (act 402). The initial traffic profile may be based on a traffic profile observed at a site that is similar to the site being modeled. The initial tags may be used to determine which sites are similar to the site being modeled.

The web site tags and the traffic profile may then be recursively modified until the traffic profile and the site tags stabilize (act 403). The final set of site tags and the final traffic profile can be thought of as a model of the site, as generated by traffic prediction component 235. The traffic profile described by the model represents the predicted traffic profile of the web site.

Figure 5:
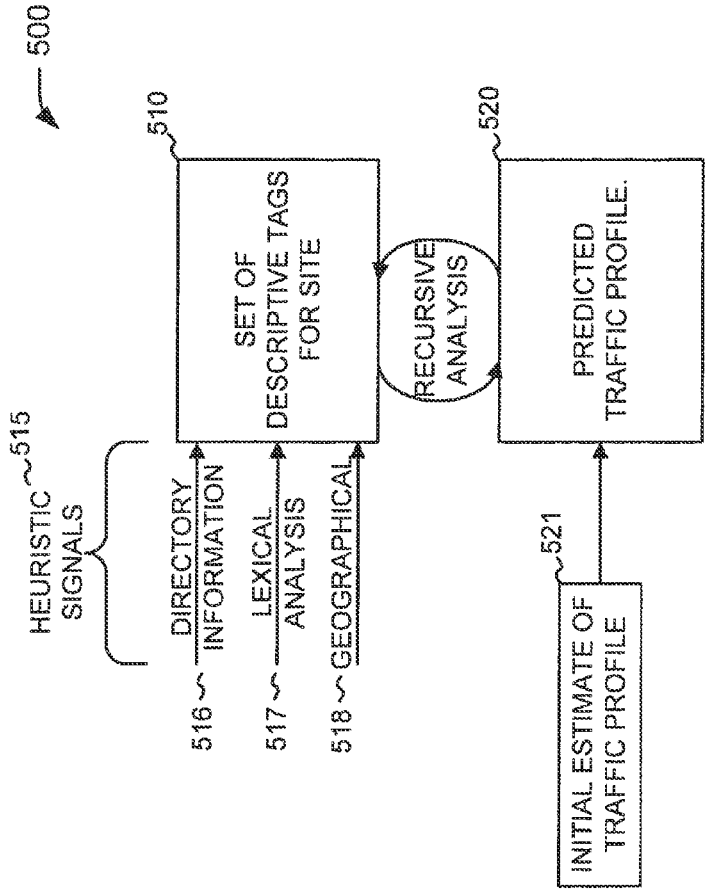
FIG. 5 is a diagram conceptually illustrating the generation of an exemplary model for a web site.

FIG. 5 is a diagram conceptually illustrating the generation of a model 500 for a web site, such as a model generated by the operations shown in FIG. 4. Model 500 may include a set of descriptive tags 510 that describe or categorize the site. Descriptive tags 510 may generally be generated with the goal of categorizing the web site in such a way that different web sites are correlated with different traffic profiles. Numerous different tags are possible. Example tags that may be used include tags that indicate the primary language used by the site (e.g., English, French, etc.); tags that categorize the site by type or intent, such as a shopping site or news site; tags that categorize the site by industry classification, such as a site targeted to computer enthusiasts or a site targeted to home contractors; tags that relate to the geographical location of the site's host; tags that indicate the average price of a product for sale (for shopping sites); or tags that characterize the hypertext markup language (HTML) layout of the site, such as tags that relate to the portion of the visual layout of the site that is text or graphics. One of ordinary skill in the art will recognize that additional tags could be used.

The initial descriptive tags for a site may be set based on heuristic signals 515. Heuristic signals 515 may generally include predetermined rules that are used to set one or more of the tags in the set of descriptive tags 510. Heuristic signals 515 may include, for example, directory information signals 516, which may set the tags to reflect a classification of the web site based on a known directory of web sites. One such known directory of web sites that may be used is The Open Directory Project (http://dmoz.org/), which is a human-compiled directory of the web that classifies web sites using a hierarchical directory structure. Heuristic signals 515 may additionally include signals 517 based on a lexical analysis of the web page. Signals 517 may, for example, be used to set tags that characterize the predominant language used by the site or the type of words used by the site (e.g., an indication of whether the site uses many technical terms). Heuristic signals 515 may additionally include signals 518 based on geographical features of the web site, such as the location of the web site host, as determined by the IP address of the web site. One or more tags may be set that define the geographical location of the web site. The above examples of heuristic signals 515 are exemplary, one of ordinary skill in the art will recognize that other heuristic signals could be used to generate tags. For example, heuristic signals based on text from sites that link to the site being modeled can be used to generate tags. For example, a tag may be set if a site is linked to by numerous known shopping sites (or other types of sites). As another example of heuristic signals 515, the design of a web page may be matched with whether the web page is exemplary of a particular type of site. For example, a web site with many web pages that include a picture, a description, and a price is likely to be an online store.

Model 500 may additionally include a traffic profile 520 that describes or categorizes the site. Traffic profile 520 may include values or tags used to characterize expected traffic, including the behavior of the traffic, at a site. Traffic profile 520 may include values that describe, for example, how long a typical user will spend at the site, how "deep" or how many links a typical user will click on within the site, the screen size of a typical user, the type of browser of a typical user, and demographic information of a typical user.

Traffic profile 520 may be initially set to reflect an estimated traffic profile 521. Initial traffic profile 521 may be set based on a known traffic profile of traffic at another site that has a similar set of descriptive tags as the initial set of descriptive tags 510. For example, if the site being modeled is a shopping site, the initial estimated traffic profile 521 may be a known (i.e., observed) traffic profile from another shopping site.

The recursive analysis of act 403 may be performed to update the set of descriptive tags 510 and traffic profile 520. In one implementation, descriptive tags 510 may be updated stochastically. For instance, occurrences of tags (based on traffic profile 520) that may potentially apply to the web site are tracked, and if the tags occur often enough, then the tags are considered to be statistically likely to apply to the web site. Conversely, tags that occur infrequently may be considered to be spurious tags that do not apply to the web site.

As an example of training of model 500, consider a web site comparing the virtues of different vendors of gasoline. This site is a product comparison site, although user behavior on this site is likely to be significantly different than user behavior on a product comparison site that compares products that the user is likely to directly buy online. That is, the user is not browsing the gasoline vendor comparison site intending to find products to buy, but is instead browsing to view the information available on the site. In this example, the traffic profile for the site is likely to be similar to sites that compare or provide information on different companies rather than other product comparison sites. Model 500, when trained on this site, will tend to generate a traffic profile consistent with a site that compares or provides information on different companies.

As another example of the training of model 500, consider a news web site. Visitors to news web sites tend to focus their attention on specific articles and read through them until they have finished reading the text of an article. This behavior can be contrasted with traffic at a product comparison site, at which users are more likely to stop reading a particular product page once they find a product that meets their needs. Model 500, when trained on a news site, will tend to generate a traffic profile consistent with behavioral differences such as this.

Exemplary Use of Models Generated by Traffic Prediction Component 235

Specific examples of the use of model 500 will now be described. As previously mentioned, traffic prediction component 235 may be used to automatically train a model 500 to obtain an expected traffic profile for a site, without requiring physical measurement or observation of traffic at the site. The predicted traffic profile for the site can be used in a number of ways.

Figure 6:
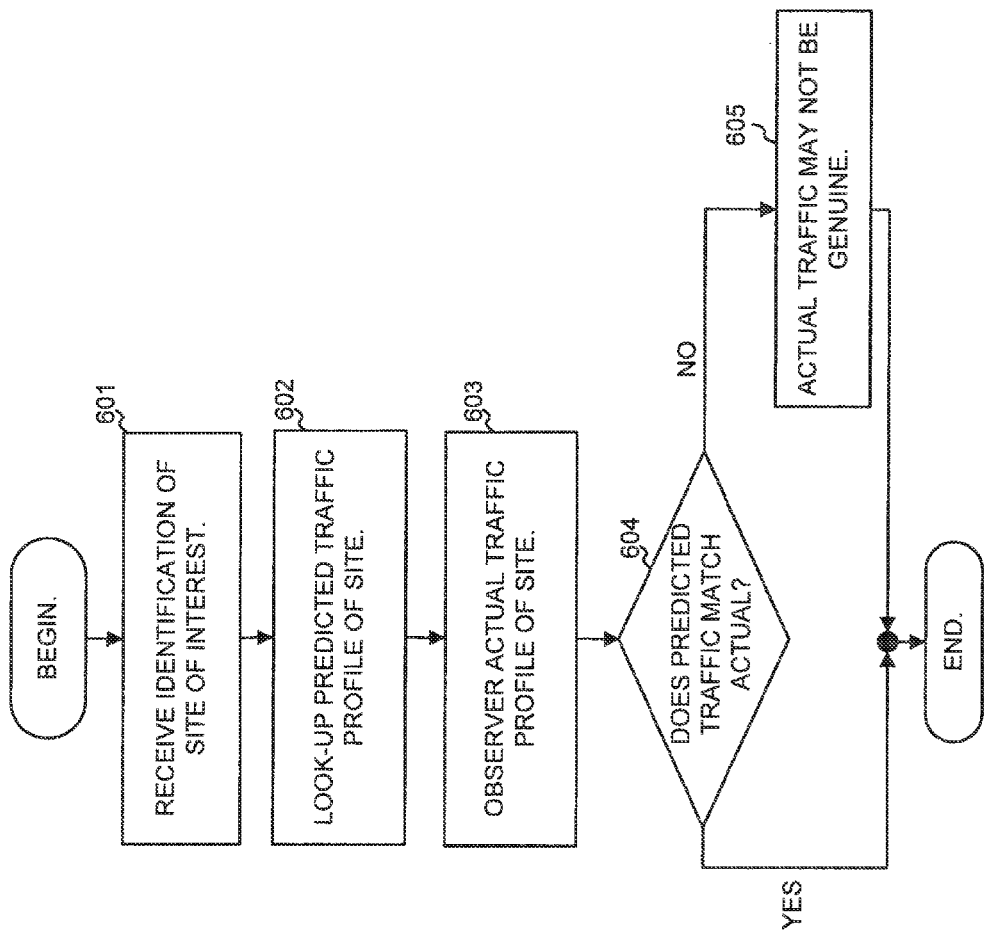
FIG. 6 is a flow chart illustrating an exemplary use of a predicted traffic profile for a site.

FIG. 6 is a flow chart illustrating an exemplary use of a predicted traffic profile for a site. As shown, a site of interest may be identified, such as by receiving or identifying a URL of the site (act 601). The URL may be used to look-up the predicted traffic profile for the site (act 602), such as a traffic profile previously generated by traffic prediction component 235. The actual traffic profile to the site may then be observed over a predetermined time frame (act 603). The actual traffic profile may be compared to the observed traffic profile and a determination made as to whether the actual traffic profile differs from the predicted traffic profile by more than a threshold level (act 604). If so, this may be an indication that the actual traffic to the site is not genuine (act 605).

One example in which it may be desirable to detect non-genuine traffic is in the context of online advertisements. Advertisers may be charged to display their advertisements based on the number of users that "click-through" an advertisement to the web site of the advertiser. It is desirable that advertisers are only charged for genuine click-throughs (i.e., click-throughs by human users that are genuinely interested in the advertisement). Advertisement click-throughs by automated programs or by malicious users that are not actually interested in the advertisement will tend to generate traffic profiles that do not match the predicted traffic profile.

Another way in which the predicted traffic profile 520, as determined by traffic prediction component 235, may be used is by using the prediction information relating to the time a user is likely to spend at the site to optimize advertisements displayed to the user. For example, different advertisements may be cycled to the user based on the amount of time that the user is expected to browse the site.

Web designers may use traffic prediction component 235 to predict how users will interact with various web layouts. Predicting how a user is likely to interact with a page may help the designer arrange elements within the page.

Yet another use of traffic prediction component 235 may be in the area of web server load balancing. Predicting how users will interact with a web site could be used to intelligently manage load-balancing for the site, such as by intelligently pre-fetching or delaying graphic loads until the user is expected to request them.

CONCLUSION

Traffic prediction component 235, as described above, can be used to automatically generate predicted traffic profiles for web sites based on tags that characterize the sites. The tags can include, for example, tags that indicate the industry with which the site is related and the intended use of the site. The tags can be automatically sent based on predetermined heuristics.

The foregoing description of exemplary embodiments of the invention provides illustration and description, but are not intended to be exhaustive or to limit the invention to the precise form disclosed. Modifications and variations are possible in light of the above teachings or may be acquired from practice of the invention.

For example, while a series of acts have been described with regard to FIGS. 4 and 6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    characterizing, by one or more processors, a first web site based on a first plurality of descriptive tags describing content of the first web site or a category of the first web site;
    determining, by one or more processors, a similarity of a second plurality of descriptive tags of a second web site to the first plurality of descriptive tags of the first web site;
    identifying, by one or more processors, the second web site based on the determined similarity of the second plurality of descriptive tags to the first plurality of descriptive tags;
    identifying, by one or more processors, a traffic profile of the second web site, the traffic profile of the second web site characterizing a behavior of a plurality of users while accessing the second web site;
    selecting, by one or more processors, an initial traffic profile for the first web site based on the identified traffic profile of the second web site; and
    generating, by one or more processors, a predicted profile of user traffic based on the characterization of the first web site and the initial traffic profile.

2. The method of claim 1, wherein the selecting of the initial traffic profile includes selecting the traffic profile of the second web site as the initial traffic profile for the first web site.

3. The method of claim 1, wherein generating the predicted profile of traffic includes recursively updating the first plurality of descriptive tags and the predicted profile of user traffic.

4. method of claim 1, wherein the first plurality of descriptive tags includes at least one descriptive tag descriptive of an intended use of the first web site, an industry classification of the first web site, a primary language used by the first web site, a geographical location of a host of the first web site, or a visual layout of the first web site.

5. The method of claim 1, wherein the traffic profile of the second web site characterizes the behavior of the plurality of users relating to how long a typical user will spend at the first web site.

6. The method of claim 1, wherein the traffic profile of the second web site characterizes the behavior of the plurality of users relating to how many links a typical user will select at the first web site.

7. The method of claim 1, wherein the traffic profile includes values relating to a screen size of a typical user of the first web site or a type of browser of the typical user of the first web site.

8. The method of claim 1, further comprising:
    heuristically determining initial values for the first plurality of descriptive tags using a set or rules and heuristic signals for the first web site.

9. The method of claim 8, wherein the heuristic signals include at least one of:
    directory information signals indicative of a classification for the first web site based on a hierarchical directory structure;
    lexical analysis signals based on a lexical analysis of the first web site; or geographical signals.

10. The method of claim 1 further comprising:
    recursively updating, by one or more processors, the first plurality of descriptive tags of the first web site.

11. The method of claim 1 further comprising:
    comparing, by one or more processors, the predicted profile of user traffic over a period of time to an actual user traffic profile over the period of time.

12. The method of claim 1 further comprising:
    selecting, by one or more processors, an advertisement based, at least in part, on the predicted profile of user traffic.

13. A computer-implemented method of modeling a predicted traffic profile of a first web site, the method comprising:
    heuristically determining, using one or more processors, initial values for a first set of descriptive tags for the first web site using a set or rules and heuristic signals for the first web site, each descriptive tag of the first set of descriptive tags describing content of the first web site or a category of the first web site;
    determining, using one or more processors, a similarity of a second set of descriptive tags of a second web site to the first set of descriptive tags of the first web site;
    identifying, using one or more processors, the second web site based on the determined similarity of the second set of descriptive tags to the first set of descriptive tags;
    identifying, using one or more processors, a traffic profile of the second web site, the traffic profile of the second web site characterizing a usage behavior of a plurality of users of the second web site;

determining, using one or more processors, an initial traffic profile for the first web site based on the identified traffic profile of the second web site; and recursively updating, using one or more processors, the first set of descriptive tags and the initial traffic profile to obtain the predicted traffic profile for the first web site.

14. The computer-implemented method of claim 13, wherein determining the initial traffic profile includes selecting the traffic profile of the second web site as the initial traffic profile for the first web site.

15. The computer-implemented method of claim 13, where the first set of descriptive tags includes at least one descriptive tag descriptive of an intended use of the first web site, an industry classification of the first web site, a primary language used by the first web site, a geographical location of a host of the first web site, or a visual layout of the first web site.

16. The computer-implemented method of claim 13, where the initial traffic profile includes values relating to how long a typical user will spend at the first web site.

17. The computer-implemented method of claim 13, where the initial traffic profile includes values relating to how many links a typical user will select at the first web site.

18. The computer-implemented method of claim 13, where the initial traffic profile includes values relating to a screen size of a typical user of the first web site or a type of browser of the typical user of the first web site.

19. The computer-implemented method of claim 13 further comprising:

comparing, using one or more processors, the predicted profile of user traffic over a period of time to an actual user traffic profile over the period of time.

20. The computer-implemented method of claim 13 further comprising:

selecting, using one or more processors, an advertisement based, at least in part, on the predicted profile of user traffic.

21. A computer-readable memory device containing one or more instructions for execution by one or more processors, the one or more instructions, when executed by the one or more processors, cause the processing logic to perform operations comprising:

characterizing a first web site based on one or more features of the first web site;

identifying a second web site based on the characterization of the first web site;

identifying a traffic profile of the second web site based on behaviors of users of the second web site while the users are accessing the second web site;

selecting an initial traffic profile for the first web site based on the identified traffic profile of the second web site;

generating a profile predicting user traffic at the first web site based on the characterization of the first web site and the selected initial traffic profile; and detecting artificial traffic to the first web site based on the generated profile predicting user traffic.

22. The computer-readable memory device of claim 21, wherein the operation of characterizing the first web site includes using a plurality of tags to describe the one or more features of the first web site, wherein the plurality of tags include at least one tag that relates to an intended use of the first web site or that relates to an industry classification of the first web site.

* * * * *

UNITED STATES PATENT AND TRADEMARK OFFICE
CERTIFICATE OF CORRECTION

| | | |
|---|---|---|
| PATENT NO. | : 9,058,562 B2 | Page 1 of 1 |
| APPLICATION NO. | : 14/168424 | |
| DATED | : June 16, 2015 | |
| INVENTOR(S) | : Victor Bennett | |

It is certified that error appears in the above-identified patent and that said Letters Patent is hereby corrected as shown below:

In the Claims

Claim 4, Line 8, add "The" before "method"

Signed and Sealed this
Twenty-fourth Day of November, 2015

Michelle K. Lee
*Director of the United States Patent and Trademark Office*